June 3, 1941.  H. PIEPER  2,244,216
POWER TRANSMITTING ARRANGEMENT FOR MOTOR-DRIVEN VEHICLES
Filed April 21, 1939
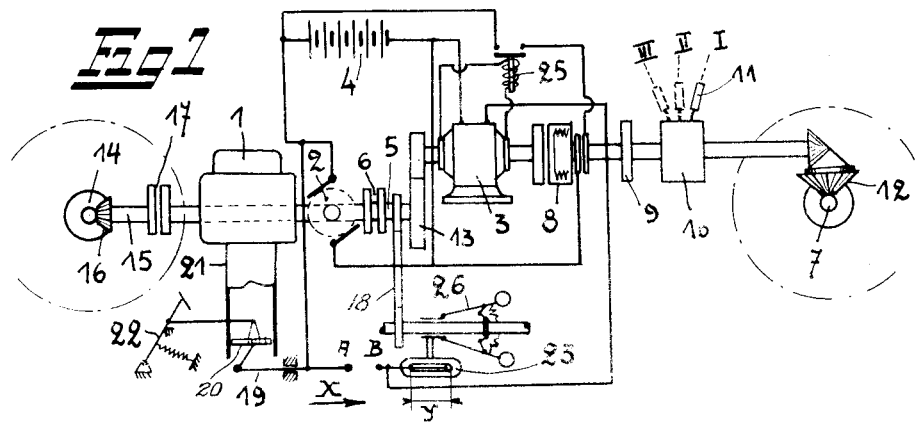
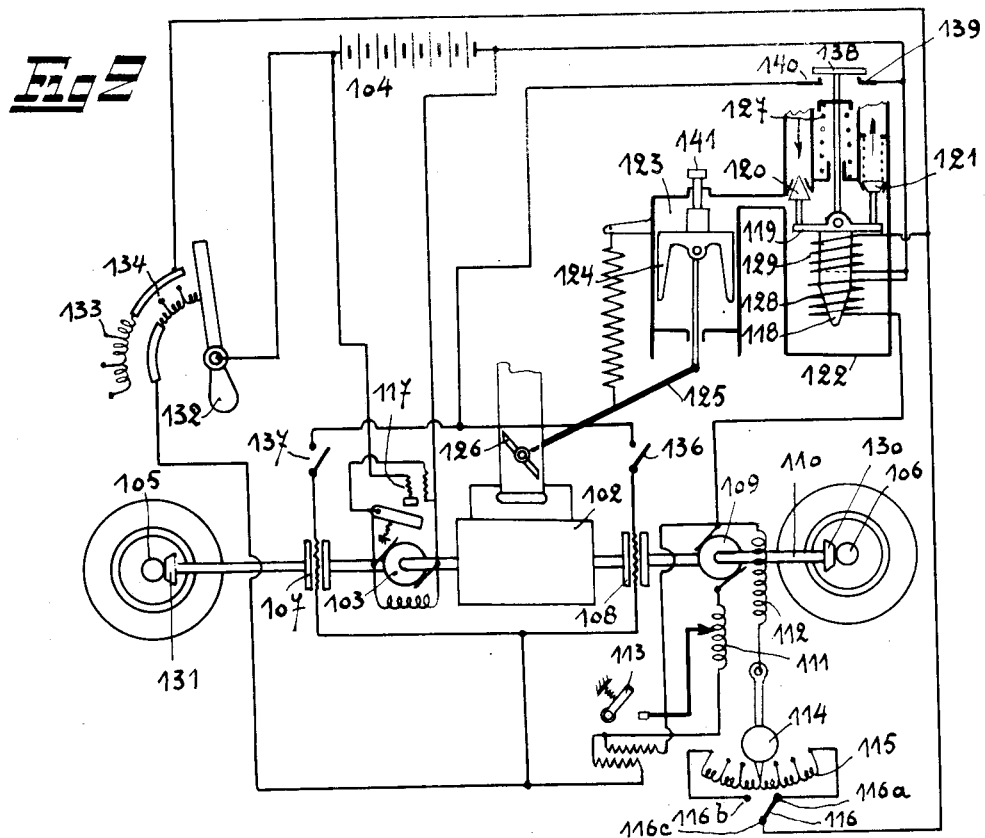

Patented June 3, 1941

2,244,216

UNITED STATES PATENT OFFICE 2,244,216

POWER TRANSMITTING ARRANGEMENT FOR MOTOR DRIVEN VEHICLES

Henri Pieper, Brussels, Belgium

Application April 21, 1939, Serial No. 269,302
In Germany April 27, 1938

15 Claims. (Cl. 180—54)

The invention relates to a power transmitting arrangement for motor-driven vehicles, particularly motor road vehicles, in which the drive is effected both at the rear and at the front pair of wheels by an internal combustion engine and by an electro-motor.

Motor road vehicles generally have rear wheel drive. Front wheel drive, however, affords certain advantages as compared with rear wheel drive. A motor road vehicle having front wheel drive is easier to control and the danger of skidding is much smaller therewith. However, the front wheel drive is open to the great disadvantage that the adhesion of the vehicle is insufficient to enable it to take somewhat steep inclines, in particular if in this case the power to be transmitted by the engine reaches the maximum value.

It has therefore already been proposed to provide a drive both for the front pair of wheels and for the rear pair of wheels of motor road vehicles and to employ for this purpose an internal combustion engine and an electric motor, the internal combustion engine being made to act on the rear wheels through a mechanical power transmission containing a change-speed gear and on the front wheels through an electrical power transmission comprising a dynamo and an electro-motor. This construction of a so-called mixed motor drive does not, however, afford sufficient allowance for all the different conditions of travel arising owing to alterations in the track.

According to the invention, a power transmitting arrangement for vehicles, particularly motor road vehicle, which is equally suitable for travelling on a level track or for climbing and descent is obtained by employing an internal combustion engine and an electro-motor, the internal combustion engine being adapted to be coupled with either of the two axles of the vehicle or simultaneously with both axles by means of power transmissions with different gear ratio, while the electro-motor, which is preferably connected to a buffer battery, is adapted to be connected to either of these two power transmissions. In order that the same gear ratio may be established with the two power transmissions for the simultaneous drive of all four wheels of the vehicle by the internal combustion engine, a change-speed gear may, according to the invention, be connected in one or the other of the two power transmissions. The internal combustion engine may be employed to drive a dynamo which is connected to the electro-motor and to the buffer battery which may be provided.

According to the invention, the electro-motor provided between the internal combustion engine and one axle of the vehicle, preferably the rear axle, may be connected to this axle by a driving device operative only in one direction, which prevents the electro-motor from assuming an excessive speed when the drive is effected at great speed by the internal combustion engine alone. The electro-motor employed according to this invention may advantageously be a series motor supplying a strong starting torque. The rotor of this series motor may be connected by an electro-magnetic clutch to the shaft to be driven thereby, the said electro-magnetic clutch only establishing the complete rigid connection after a certain time.

In order to realise an automatic regulation of the cooperation of the internal combustion engine and the electro-motor, a separate control device may be provided according to the invention which is influenced by two factors, that is, the speed of the vehicle or of the internal combustion engine and the position of a lever controlling the feeding of this engine. This control is effected by the acceleration lever of the internal combustion engine and also by a centrifugal regulator which may, if desired, operate with retardation during reductions in the speed of travel, for example with the aid of a slot or a similar movement transmission acting with idle movement.

In order to prevent excessive discharge of the battery when the vehicle takes a steep incline, a time relay or a similarly acting device may, according to the invention, be connected in the circuit of the electro-motor. This relay is so constructed that the time after which it responds is shorter in proportion as the current strength is greater. When the relay responds it sets in operation an optical or acoustical indicating instrument which draws the driver's attention to the fact that an alteration in speed, that is to say in the ratio of the power transmission, is advisable. This relay may, instead of or in addition to setting up a signal, effect the breaking of the circuit of the clutch for direct engagement and the operation of the clutch for reduced speed.

According to the invention the buffer battery supplying the current for an electro-motor mechanically connected to one of the vehicle axles is adapted to be recharged by this motor, which is constructed as a shunt machine or preferably as a compound machine and may therefore be employed as a current generator, if necessary by a charging dynamo coupled mechanically with the internal combustion engine, and the starting and acceleration of the vehicle are effected by the connection of the electro-motor to the battery.

It is known that the characteristics of the operation of an electro-motor may be varied by varying the energisation of the electro-motor. According to the invention, the speed of the electro-motor is controlled in dependence upon the accelerations and reductions in speed of travel and upon the profile of the track with the aid of a pendulum which varies the excitation of the electro-motor in dependence upon its momentary position.

In order to control the operation of the internal combustion engine by the current of the circuit of the electro-motor, a fuel feeding device influenced by a servo-motor is provided according to the invention, the operation of which is regulated by an electro-magnet comprising two windings, one of which is connected in parallel and the other in series with the battery and both of which operate in the same sense when the battery is being discharged and in opposition to one another when the battery is being charged.

According to the invention, the internal combustion engine may be connected furthermore to one or more vehicle axles by one or more magnetic clutches which establish automatically the completely rigid connection when the maximum voltage across the terminals of the electro-motor, from which the circuit of these clutches are branched, is reached. According to the invention, these circuits may be controlled by the aforesaid electro-magnet, in which case the internal combustion engine may be uncoupled from the vehicle axle or axles driven thereby as soon as the charging current of the battery reaches a predetermined value.

In order that the vehicle may be propelled in both directions of travel for the same direction of rotation of the internal combustion engine, the internal combustion engine may, according to the invention, be coupled either with the front wheel axles or with the rear wheel axles by pinions disposed inversely with respect to one another. This arrangement permits of effecting an auxiliary safety braking by simultaneous excitation of the electro-magnetic clutches provided on both sides of the internal combustion engine. Furthermore, the invention also provides for the automatic reversal of the connections of the electro-motor during the mechanical changing over of these clutches.

The drawing shows diagrammatically by way of example two constructional forms of the power transmitting arrangement according to the invention.

Fig. 1 is a diagrammatic view showing one form of a power transmitting arrangement.

Fig. 2 is a similar view of a modified arrangement.

In the Figure 1, the power transmitting arrangement intended, for example, for a motor road vehicle comprises as source of energy an internal combustion engine 1 which is coupled mechanically with an electric current generator 2 serving to supply current to the electro-motor 3 and to charge a buffer battery 4 feeding the electro-motor in the case of necessity. The electro-motor 3 drives a shaft 5 which may be connected to the internal combustion engine 1 by the clutch 6. The shaft of the electro-motor 3 may be connected to the rear axle 7 of the vehicle through a gear 12 by means of an electro-magnetic clutch 8 receiving current from the battery 4.

This clutch 8 is only intended to establish the rigid connection after a certain time when the counter-electro-motive force of the electro-motor has reached a sufficient value to reduce the influence of the starting current. For this purpose, there is connected to the terminals of the armature of the electro-motor 3 a small relay 25 which does not close the circuit of the electro-magnetic clutch 8 until the voltage across the armature terminals of the electro-motor 3 has assumed a certain value. In this way, the clutch 8 is energised automatically after the switching on and starting of the electro-motor 3 when a predetermined voltage is set up across the terminals of the motor armature and connects the motor 3 to the rear wheel axle 7.

The relay 25 may be replaced by a centrifugal switch which is driven by the electro-motor 3 and automatically places in circuit the electro-magnetic clutch 8 when a predetermined motor speed is reached. In order to prevent the electro-motor 3 from rotating at an excessive speed when the internal combustion engine 1 alone effects the drive at great speed, there may be disposed between the electro-motor 3 and the rear wheel axle 7 a freewheel 9 which prevents the transmission of the rotational movement of the rear wheel axle 7 to the motor 3.

Furthermore, there is provided between the electro-motor 3 and the rear axle 7 of the vehicle a reversing gear 10 which is adjusted by the lever 11. This lever may take up three positions I, II and III, of which the first corresponds to the forward movement and the third to the reverse movement, while the second is the neutral position. In this latter position, the electro-motor 3 is uncoupled from the real wheel axle 7, which permits it to be employed for starting the internal combustion engine 1.

A reduction gear 13 is provided between the internal combustion engine 1 and the electro-motor 3 and the rear wheel axle 7. The internal combustion engine 1 is connected to the front wheel axle 14 by a shaft 15 through a gear 16, and a clutch 17 serves to connect the internal combustion engine 1 with the shaft 15. The clutches 17 and 6 may be engaged manually and disengaged by the driver by mechanical means.

In order to place the automobile vehicle in gear, the driver rotates the lever 11 of the reversing gear 10 from the neutral position II into the forward movement position I and separates the front wheel axle 14 from the internal combustion engine 1 by disengaging the clutch 17, while he connects the electro-motor 3 to the internal combustion engine by engaging the clutch 6. When the voltage across the terminals of the armature of the electro-motor has reached a certain value, the relay 25 closes the electro-magnetic clutch 8, so that the rear wheel axle 7 is driven by the internal combustion engine 1 and the electro-motor 3. When the vehicle is in movement, the drive may be effected at the front wheel axle 14 alone by the internal combustion engine 1 after the engaging of the clutch 17. The electro-motor 3 serves in this case only to compensate for the increased energy required by the drive of the rear wheel axle 7 due to accelerations or other output peaks.

This switching on and off of the electro-motor 3 may be effected automatically by providing in the motor circuit two movable contacts A and B, one of which for example, the contact A, is controlled by a centrifugal regulator 26 driven by the shaft 5 through the intermediary of the intermediate member 18, while the throttle valve 20, which is provided in the gas supply conduit 21 of the internal combustion engine 1 and is adjusted by the pedal lever 22, transmits its movements to the other movable contact B through the lever 19.

When the internal combustion engine 1 is running at low speed, the throttle valve 20 is almost perpendicular to the flow of gas in the pipe 21 and holds the contact B at a distance from the contact A. When the speed of the internal combustion engine 1 is increased, the throttle valve 20 takes up an inclined position with respect to the direction of the flow of gas and tends to move into a position parallel thereto, whereby the two contacts A and B come into contact with one another. The speed increases, so that the centrifugal regulator 26 becomes effective and again moves the two contacts A and B apart. If desired, this action of the centrifugal regulator 26 may take place with retardation during reduction of speed with the aid of the slot 23. If the speed falls below a predetermined value when the accelerator 22 is in a determined position, the contacts A and B touch one another, whereby the electro-motor 3 is switched on, so that it takes part in the drive of the vehicle by acting on the rear wheel axle 7 and increases the speed of the vehicle.

When the internal combustion engine 1 is running slowly and the vehicle is stationary, the contacts A and B are moved a certain distance apart and the circuit of the electro-motor 3 is broken. If the driver depresses the accelerator 22 lightly, the internal combustion engine 1 runs more rapidly and the contacts A and B touch one another, so that the electro-motor 3 is switched on and the vehicle starts after engagement by the clutches 6 and 8 with simultaneous disengagement of the clutch 17. Owing to the increase in the speed of the vehicle, the centrifugal force regulator 26 driven by the internal combustion engine 1 displaces the intermediate member 18 in the direction of the arrow X and after this intermediate member 18 has completed a stroke $y$ separates the contact A from the contact B so that the circuit of the electro-motor 3 is again broken.

If the driver depresses the accelerator lever 22 more strongly, the contacts A and B again touch one another and the electro-motor is again set in operation, so that a further increase in the speed of the vehicle occurs which again causes the separation of the contacts A and B. When the vehicle is travelling more slowly, for example when taking a steep incline, and this reduction in speed is sufficient to cause the centrifugal regulator 26 to displace the contact B and to close the circuit of the electro-motor 3, the electro-motor is again set in operation and assists the drive.

As may be seen from this illustration of the power transmission in the Figure 1, the electro-motor 3 operates intermittently as often as is necessary, in order rapidly to set the vehicle in motion or to effect a rapid acceleration after reduction in speed. At the same time, both front wheel drive and the drive of the two axles 7 and 14 of the vehicle by the internal combustion engine are possible. Moreover, it is completely impossible for the driver to overload the battery 4. In this way, all the requirements are met which arise in the driving of vehicles by means of internal combustion engines and of an electromotor connected to a battery, in cases where it is desired that this mixed installation should operate favourably from both the technical and the economical point of view and should be utilised advantageously for the front wheel drive of vehicles.

In the constructional form illustrated by Figure 2, an internal combustion engine 102 is mechanically connected to a small charging dynamo 103 which is connected electrically to a buffer battery 104 and may be coupled with the rear wheel axle 105 or the front wheel axle 106 of a vehicle by means of the electro-magnetic clutches 107 and 108, which act through the gears 130 and 131 on the axles 105 and 106 and the windings of which are connected to the terminals of the electro-motor 109. The electro-motor is mounted on the shaft 110 which connects the internal combustion engine to the front wheel axle 106.

The electro-motor 109 is constructed as a shunt machine or preferably as a compound machine with a series winding 111 and a shunt winding 112. It is known to employ this type of electro-motor when it is desired to recover electrical energy. In the arrangement according to the invention, this electro-motor 109 operates in certain cases as a motor, while in other cases it may operate as a charging dynamo for the buffer battery 104 and may even completely replace the charging dynamo 103. It is employed as a motor particularly when the resistance torque exceeds the torque which is supplied by the internal combustion engine, as may be the case for example during climbing, while when descending, during braking and in some cases when travelling along a level track, it operates as a current generator and effects a recovery or conversion of energy by charging the buffer battery 104.

It is known that electro-motors having strong series excitation are most suitable for meeting the driving conditions of vehicles. On the other hand, it is desirable for charging the accumulator batteries to suppress or at least to reduce the action of the series winding. This is allowed for by an automatic switch 113 which entirely or partly short-circuits the series winding 111 during charging of the battery and places this excitation winding completely in circuit when the battery sends current to the electro-motor.

If it is desired to maintain the speed of a compound motor constant with increasing resistance torque, the inducing field must, as is known, be weakened. According to the invention, this influencing of the field in the electro-motor 109 is effected automatically with the aid of a pendulum regulator 114 which is connected in series with the shunt exciting winding 112 and slides over contacts with the resistances 115 connected therebetween. When the vehicle is travelling down an incline, these resistances 115 are entirely or partially switched out of the exciting circuit, while they are entirely or partially switched in during climbing.

This alternation of the exciting field in accordance with the inclination of the track is rendered independent of the direction of travel of the vehicle by a reversing switch 116. During forward running and descent of the vehicle, the regulator 114 takes up such a position that the resistances switched in have a small value or are reduced to zero. The same resistances would remain connected if the vehicle travelled in the opposite sense, that is to say, was climbing. In this case, however, use is made of the reversing switch 116, the key of which moves from the position 116a, 116c into the position 116b, 116c and automatically maintains in the electro-motor 109 a field excitation dependent upon the inclination of the track and upon accelerations and retardations. This device has the further advantage that at each reduction of speed or at each braking it acts by its inertia on a shunt excitation of the electro-motor 109, so that this electro-motor operates as a current generator and recovers energy. The reversing switch 116, when it is displaced, also effect the change-over of the electric connection of the electro-motor through a suitable connection.

The small charging dynamo 103 need not be operated frequently and in certain cases may be entirely omitted, as the charging current is supplied by the electro-motor 109 when this electro-motor is operating as a current generator either owing to the recovery of energy during downward travel, braking and reduction of speed or owing to conversion of the energy available at the internal combustion engine or transmitted thereto by the movement of the vehicle. The electrical energy generated in this manner may in certain cases be completely sufficient to compensate for the electrical energy consumed during starting or during acceleration.

The small charging dynamo 103 is connected to an automatic charging current regulator not shown and to an automatic switch 117 and these two devices serve automatically to disconnect the dynamo from the circuit of the battery 104 when the electro-motor 109 receives current from this battery.

In order to control the feeding of the internal combustion engine 102 by the current of the electro-motor 109, a servo-motor is provided in which an electromagnet 118 provided with a plate 119 actuates two valves 120 and 121 opening in opposite directions, which control the inlet and outlet of a pressure liquid entering a chamber 122. The chamber 122 communicates with a cylinder 123, in which there is arranged displaceably a piston 124 connected by means of a lever 125 to the throttle valve 126 of the internal combustion engine 102 or another device for regulating the supply of fuel to the engine. The electro-magnet 118 is under the action on the one hand of a spring 127 tending to open the outlet valve 121 of the servo-motor and on the other hand of two windings, one of which 129 is connected in parallel and the other 128 in series with the battery 104 or the electro-motor 109. The two windings 128, 129 act in the same sense when the battery is being discharged and in opposition to one another when it is being charged.

According to the invention, the arrangement is such that the mechanical energy supplied by the internal combustion engine 102 upon starting may be reduced or zeroized when the vehicle has reached a predetermined speed, this being done automatically, without the displacement of the control lever of the control switch, with the aid of a centrifugal regulator, which acts on the excitation of the electro-motor 109 when the aforesaid predetermined speed of travel has been reached. In this case, it is advisable to maintain the speed of the vehicle by correspondingly acting on the servo-motor controlling the blocking of the fuel of the internal combustion engine, which may be effected by employing the centrifugal regulator to vary the operating conditions of this servo-motor.

The two magnetic clutches 117 and 118 connecting the internal combustion engine 102 to the front and rear axles of the vehicle operate automatically and progressively and the engagement thereof is controlled by the switches 136 and 137 connected in their circuit. They are connected to the terminals of the electro-motor 109 and, when the resistances 134, 135 provided in the circuit of this motor are completely switched out by the switch arm 132, effect a completely rigid connection of the internal combustion engine 102 to the shafts leading to the vehicle axles 105, 106. When the circuit of the electro-motor 109 is broken by rotation of the switch arm 132 the circuit of the clutches 107 and 108 is also opened.

In order to recover the maximum quantity of energy when the electro-motor 109 operates as a generator, it is desirable to uncouple the internal combustion engine from the vehicle axle or axles driven thereby and at the same time to reduce the quantity of fuel fed thereto and thus to make it operate slowly. For this purpose, the electromagnet 118 is, according to the invention, provided with a flexible metal sheet 138 which is insulated from its core and closes the circuit of the magnetic clutches 107 and 108 at the contacts 139 and 140. This circuit closing is effected when the battery 104 is being discharged, while the circuit of the clutches is broken automatically as soon as the electro-motor 109 commences, as current generator, to charge the battery 104 with a current of a certain strength. In this way, the recovery of energy is increased to a maximum and the consumption of fuel is reduced to a minimum. For closing and opening the circuit of the clutches, a small separate relay influenced by the current flowing through the electro-motor 109 may be provided.

When the cylinder 123 of the servo-motor is under atmospheric pressure, the fuel supply to the internal combustion engine 102 is reduced to the amount necessary for the slow running thereof. This quantity of fuel may be regulated by means of a stop adjustable by a screw 141, which limits the lift of the piston 124, and by prevention of the complete closing of the fuel supply pipe to the internal combustion engine. This arrangement also causes the internal combustion engine to change automatically to low speed when the vehicle is stationary, whereby the fuel supply is reduced to a minimum, so that racing is not to be feared upon subsequent starting of the internal combustion engine.

If an internal combustion engine acting in both directions is employed, the driving pinions of the axles need not be inversely disposed with respect to one another and the two clutches may be simultaneously operated. If, on the other hand, an internal combustion engine operating in only one direction is employed, the power transmission to the axles 105 and 106 is effected with the aid of pinions 130 and 131 acting in opposite directions to one another, which permit the movement of the vehicle in both directions of travel with constant direction of rotation of the internal combustion engine 102. The change over of the clutches 107, 108 alternates simultaneously with the connections of the electro-motor 109. The use of pinions 130 and 131 disposed inversely with respect to one another also permits of carrying out an auxiliary safety braking, it merely being necessary simultaneously to engage both clutches when stopping the vehicle in order to prevent any movement of the vehicle and to lock the vehicle in the stationary position.

The entire control of the vehicle may be effected by the switch arm 132, which slides over the contact members 133 and 134 connected by resistances. The contacts 133 lie in the shunt exciting circuit of the electro-motor 109 and the resistances situated between them are so connected that when the switch arm 132 is rotated in the circuit-closing direction they increase in order to increase the speed of the vehicle. The contacts 134 are, on the other hand, connected in the armature circuit of the electro-motor 109 and the resistances provided between these contacts decrease upon rotation of the switch arm 132 in the aforesaid direction.

The use of the electro-motor acting as a current generator upon reduction in speed provides, in combination with the use of the normal brakes, a braking varying automatically in dependence upon the speed of the vehicle. This operation of the electro-motor also renders possible the recovery of a large part of the energy consumed and consequently also a considerable saving in fuel.

Instead of only one internal combustion engine and an electro-motor connected thereto, a plurality of units formed of two such machines may be employed.

What I claim is:

1. In driving apparatus for driving wheeled vehicles, the combination of front and rear driving wheels, an electro-motor for driving the same and an engine capable of rotating a generator furnishing electrical current to said electromotor, transmissions with different gear ratio between the engine and the front and rear wheels and clutches in said transmissions.

2. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor driving one of these transmissions.

3. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor, connected to a buffer battery, driving one of these transmissions.

4. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor driving one of these transmissions, a change speed gear arranged in one of these transmissions enabling an equalization of their gear ratio.

5. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor driving one of these transmissions by a driving device operative only in one direction of rotation.

6. In driving apparatus for driving wheeled vehicles, the combination of front and rear driving wheels, an electro-motor for driving the same and an engine capable of rotating a generator furnishing electrical current to said electro-motor, transmissions with different gear ratio between the engines and the front and rear wheels and clutches in said transmissions, the electro-motor arranged between the engine and one of the pairs of wheels, driving the correspondent transmission.

7. In driving apparatus for driving wheeled vehicles, the combination of front and rear driving wheels, an electro-motor for driving the same and an engine capable of rotating a generator furnishing electrical current to said electro-motor, transmissions with different gear ratio between the front and rear wheels and clutches in said transmissions, the electro-motor driving one of these transmissions by means of a clutch enabling a sliding during the first driving period.

8. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions the electro-motor driving one of these transmissions by means of electrical clutch, an auxiliary relay rendering this clutch wholly operative when the electrical tension in the generator has a predetermined value.

9. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions means for controlling the electro-motor and the engine comprising a connection with a tachymeter and with a lever controlling the engine.

10. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions means for controlling the association of the electro-motor and the engine comprising a connection with a centrifugal regulator, a lost motion in this connection, and a connection with a lever controlling the gas admission in the engine.

11. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor, connected to a buffer battery, driving one of these transmissions, a time relay preventing excessive discharge of the battery.

12. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor, connected to a buffer battery, driving one of these transmissions, and indicating means being operative upon excessive discharge of the battery.

13. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor driving one of these transmissions, and means rendering the electro-motor inoperative when the speed of the vehicle has reached a certain value.

14. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor driving one of the transmissions, a change speed gear arranged in one of these transmission enabling an equalization of their gear ratio and means operating a change speed gear in the transmission between the engine and the wheels when the discharge of the battery is rendered excessive.

15. In driving apparatus for driving wheeled vehicles, the combination of front and rear driving wheels, an electro-motor for driving the same and an engine capable of rotating a generator furnishing electrical current to said electro-motor, transmissions with different gear ratio between the engine and the front and rear wheels and clutches in said transmissions, the electro-motor driving one of these transmissions, and means being provided for controlling the speed by a pendulum operating on the excitation current of the electro-motor.

HENRI PIEPER.